Sept. 28, 1954  G. F. H. VON STROH ET AL  2,690,252
FLEXIBLE BELT SHAKER CONVEYER
Filed April 5, 1951  5 Sheets-Sheet 3

INVENTORS
*Herman E. Smith* and
*Gerald F. H. von Stroh*
BY
ATTORNEY

Sept. 28, 1954  G. F. H. VON STROH ET AL  2,690,252
FLEXIBLE BELT SHAKER CONVEYER
Filed April 5, 1951  5 Sheets-Sheet 4

INVENTORS
*Herman E. Smith* and
*Gerald F. H. von Stroh*
BY
ATTORNEY

UNITED STATES PATENT OFFICE 2,690,252

FLEXIBLE BELT SHAKER CONVEYER

Gerald F. H. von Stroh and Herman E. Smith, Huntington, W. Va., assignors to Bituminous Coal Research, Inc., Washington, D. C., a corporation of Delaware Application April 5, 1951, Serial No. 219,330

20 Claims. (Cl. 198—220)

Our invention relates to a shaker conveyor mechanism, and more particularly to a shaker conveyor apparatus employing relatively flexible belting, such as strip steel, as the conveying element.

The invention may be briefly described as comprising a reciprocating reel or spool upon which the desired amount of belting may be wound, said spool imparting shaker motion to the extended portion of the belting, and a means for exerting tension on the extended portion thereof. One end of the belting is, of course, affixed to the spool and the opposite end secured to a tension and tramming assembly, the latter comprising a movable support here disclosed as a tractor provided with a usual type of driven treads. Reciprocations of the spool are obtained by shaker mechanism which imparts the desired shaking motion to the entire length of the belting through the aforesaid reciprocatory motion of the sliding spool. The conveyor belting so mounted can be retracted or extended at the will of the operator through a novel pawl and pin construction which utilizes the reciprocations imparted to the reel to turn the reel in the desired direction in a manner which will hereinafter be described. The belting itself has a permanent concavo-convex set to it so that in normal usage, it assumes a natural trough shape.

This invention is applicable to almost any industry where conveying systems have long been used, but is particularly adaptable to the coal mining industry where considerations of work space, flexibility of operation and power requirements are factors of the greatest significance in conveyor systems installed for transporting mined coal from the face. Since this mechanism can be operated in rooms of extremely low overhead, and adjustment of the length of the conveyor element may be accomplished with extreme ease, the invention possesses the greatest industrial and practical utility. These broad features of the invention differ most radically from prior conveyor systems where extension and retraction of such a system is ordinarily most difficult.

Heretofore, conveying mechanisms of the shaker type employing the rigid pan or trough system have presented severe problems of adaptability to various conditions. Such troughs are supplied in definite and relatively short lengths; to obtain a conveyor system of the desired size, such pans must be secured together by some form of clamping or equivalent means, manually attached, which expends considerable labor, not to mention additional parts. Each time such a system is shortened, troughs must be removed by hand, and conversely, each time the system is lengthened, the pan line must be supplemented by the manual addition of more troughs in a time and labor consuming operation. The principle of extension and retraction of the strip conveyor element which is contemplated by this invention does not call for the addition of costly and complex equipment but depends upon the same type of shaker motion common to actuation of the rigid and well known type of trough system. That motion is typified by a relatively slow forward motion and a fast and accelerated rearward motion. The article conveyed is carried forward by the slow motion and the conveyor, by its rapid rearward motion, slips quickly under the material conveyed without imparting substantial motion to it. Application of this type of motion has not heretofore been successfully applied to conveyor belts made of relatively flexible materials. The invention herein is applicable to various types of such belts, and specifically to belts fabricated of strip steel or other alloy strip metal, composition, leather, or any other suitable material having inherently flexible characteristics.

From the foregoing, it is apparent that a primary object of this invention is to provide a mechanism whereby shaker or reciprocatory motion may be imparted to a relatively flexible and resilient belt for material conveyance purposes.

It is a further object of this invention to provide means whereby such a conveyor element may be, with regard to its overall length, extended and retracted through use of the same reciprocatory movement that provides the overall forward motion of the material conveyed by the system. This is accomplished by a transfer of movement from the reciprocatory to the rotary through the use of a novel pawl and pin assembly whereby the strip conveyor element may be either wound upon or unwound from a winding spool to which rotary movement is imparted by said assembly.

A further object of the invention is to provide unique tension means at the forward or material receiving end of the conveyor element which permits the exertion of a constant tension upon the belt while performing its shaker, and consequent conveying, operation, and to mount the said tension means upon a portable conveyance which, through its own power, locates the forward end of the belt at the desired location which may be either at the face or other loading position.

A further advantage of this invention resides in the practical and industrial solution of a problem which has long confronted the industry by the provision of means which, considering related types of apparatus, is relatively simple in design and which may be fabricated at comparatively low cost.

Reference will now be made to the drawings for a more particular description of our invention, and wherein like designations signify like parts throughout the several views thereof, and in which.

Figure 1:
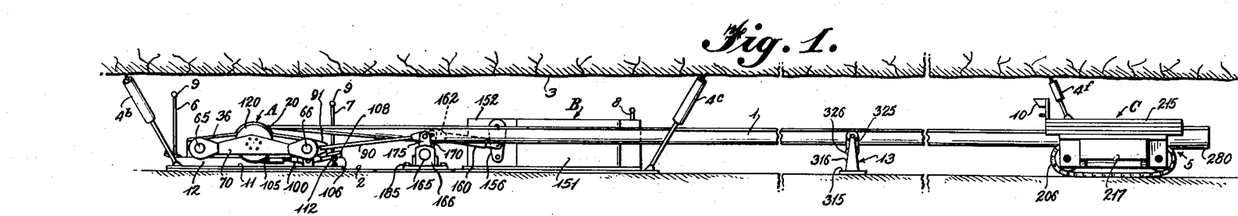
Figure 1 is a side elevation view of a flexible belt shaker conveyor system embodying the novel principles and teachings of the present invention.
Figure 2:
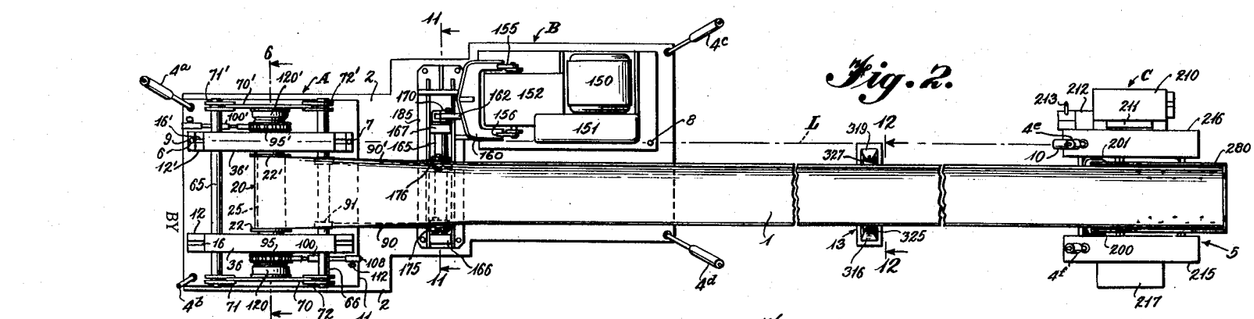
Figure 2 is a plan view of the invention as shown in Figure 1.
Figure 3:
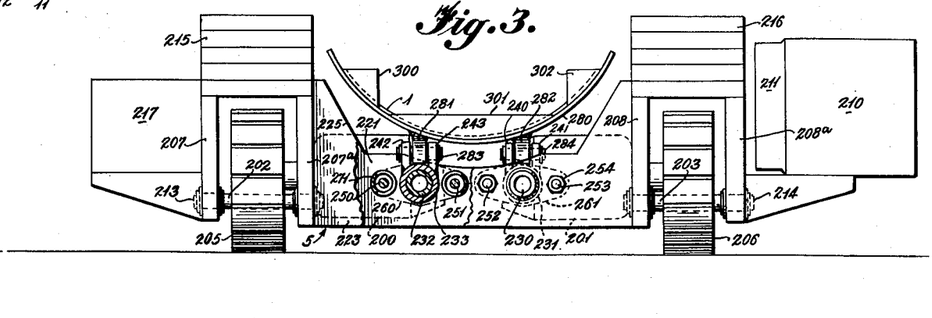
Figure 3 is an elevation view, partly in section, of the tramming and tension assembly of the invention.

Referring to Figures 1 and 2, it will be seen that the device of this invention encompasses several interrelated concepts which include the winding spool and its assorted mechanism, generally indicated at A; the shaker drive means and the associated elements thereof which impart reciprocatory motion to the winding reel, generally indicated at B; and the tension and tramming apparatus at the opposite end of the conveyor element, generally indicated at C.

The belt 1 is extended between apparatus A and C and is supported throughout its length by a series of roller supports, generally indicated at 13, and which will be hereinafter described in more detail. Both the reel mechanism A and the shaker means B are mounted upon a common base 2. The opposite end of the belt 1, as stated, is secured to a tramming apparatus, including a tension device and tractor or movable carriage therefor, generally indicated at 5.

As shown in Figure 1, the entire mechanism is herein described, for purposes of illustration, with respect to its location and use in the room of a coal mine wherein the roof thereof is designated at 3. After movement to the desired position in the shaft, securing means may be utilized to prevent the movement of any of the elements A, B, or C from their desired position. As here shown, the means to secure the several parts against movement take the form of either screw or hydraulic jacks. Base 2 is so positioned against movement by four such jacks, 4a, 4b, 4c and 4d, located at the opposite four corners of the base 2. Each of these jacks may be swiveled to the base and pairs 4a and 4b angled outwardly from the base at the top thereof, whereas pairs 4c and 4d are angled outwardly from the base in an opposite manner, further assuring the base against movement from the desired position by either considerable tension upon the conveyor element 1, or operational vibration. With respect to the vehicle or movable carriage 5, a pair of similar hydraulic jacks 4e and 4f may be employed to similarly affix that element in position when once set for operation. Since pull of the conveyor belt is rearwardly upon the tractor 5, the jacks are also canted outwardly therefrom and in a direction towards the winding spool in a manner indicated in Figures 1 and 2.

Base 2 is provided with three uprights 6, 7 and 8, the last two being successively shorter than upright 6. These are spaced apart as shown and are mounted in parallel relationship to the longitudinal centerline of the winding spool assembly. These are capped with electric lights 9 which enable the operator of the trammer, by sighting rearwardly and aligning the said lights, to determine longitudinal alignment of the trammer with the spool assembly.

This alignment is facilitated through the use of an optical sighting device 10, well known within the art, embodying essentially the features of a transit. If the device utilized is of a periscope type, fitted with cross hairs in a conventional manner, the operator may direct his attention to the face while sighting the belt alignment. The device 10 is rigidly attached to the trammer 5 at a point spaced from the centerline of the belt the same distance as the distance the targets 6, 7 and 8 are spaced from the centerline of the belt. Thus, alignment is accomplished by the operator by sighting the lights in the optical device in a manner which will be obvious to those skilled in the art. As shown in Figure 2, when targets 6, 7 and 8 are aligned on line of sight L, as viewed through optical device 10, the trammer is in proper and aligned position.

For purposes of clarity, the several operative mechanisms of this invention will be referred to and described separately, the functions of each being characterized by an explanation of their respective relationship.

*The winding spool and mounting therefor*

Figure 6:
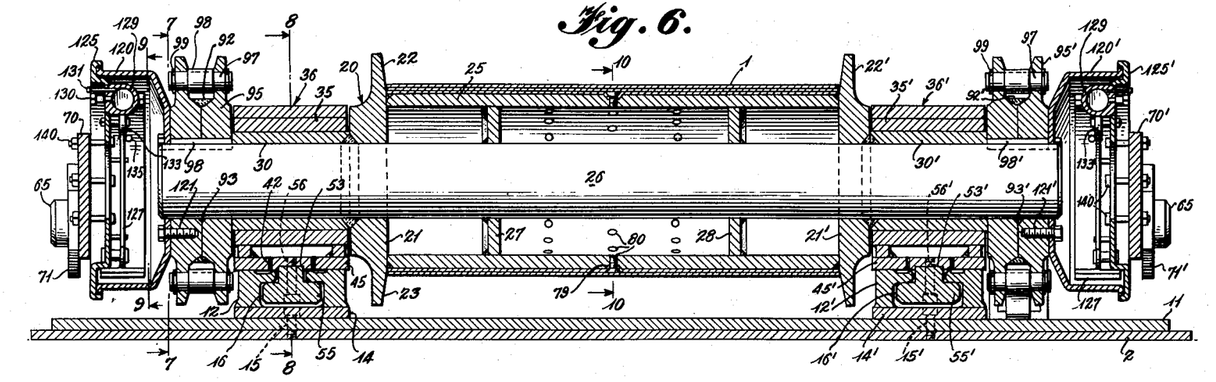
Figure 6 is a transverse section view, taken on the line 6—6 of Figure 2 showing details of the reciprocating conveyor belt spool.

Referring to Figure 6, an additional base 11, superimposed upon base 2, is provided for the winding spool or reel. As shown in this figure, several layers of the conveyor belt 1 are wound upon the spool, generally indicated at 20. The spool is provided with two opposed flanges 21 and 21', each of which has a peripheral rim 22 and 22', respectively, extending radially from the base, which rims, as shown in Figure 6, have their inner peripheral surface angularly disposed outwardly to facilitate reception of the conveyor strip 1 as it is wound upon the spool. Separating the flanges 21 and 21' and welded to each is a tubular member or drum 25, of comparatively large diameter, mounted upon the spool drive shaft 26. Additional supporting ring struts 27 and 28 for the drum are welded or otherwise secured in any suitable fashion to both drum 25 and the shaft 26. The flanges 21 and 21' are also welded to shaft 26 in the manner shown.

The spool is mounted for reciprocatory motion in a lateral plane and to this end, slide rails 12 and 12' are provided. Such rails are formed with T-shaped slots therein, as shown at 16 and 16'. The bases 14 and 14' of the slide rails 12 and 12' may be secured to the base 11 upon which the entire spool arrangement is mounted by any suitable means such as bolts 15 and 15'.

Figure 8:
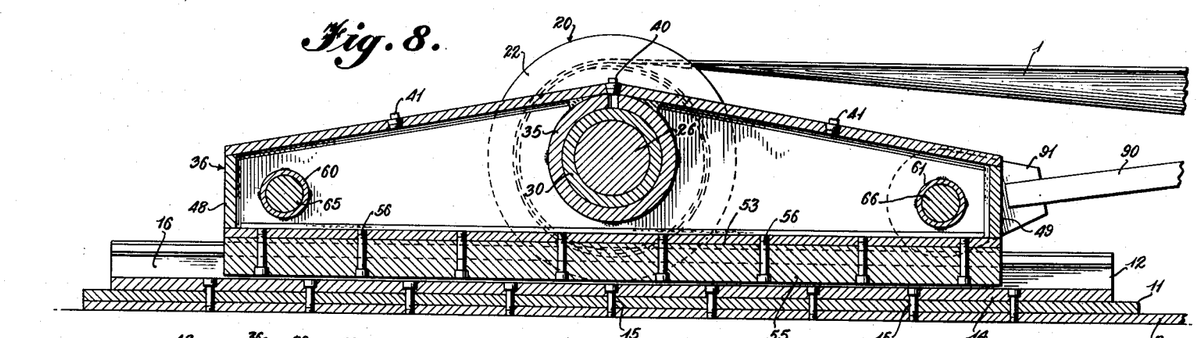
Figure 8 is a section view taken on the line 8—8 of Figure 6.

The spool drive shaft 26 is provided with bronze bearings 30 and 30' upon each side of rims 21 and 21' which bearings are also shrunk fit to shaft 26 and/or welded to the shaft and the respective adjacent rims. Bearing surfaces 35 and 35', to accommodate bearings 30 and 30', and in the form of steel bushings, are positioned in two sliding pillow blocks generally indicated at 36 and 36'. As shown in Figure 8, the sliding pillow blocks 36 and 36' terminate at their upper edges in an apex within which are positioned oil cups or oil filler plugs 40 for lubrication of shaft 26.

Pillow blocks 36 and 36' are provided with bases or slide plates 45 and 45'. Each of slide plates 45 and 45' has a T slide affixed thereto, 55 and 55' respectively, adapted for sliding engagement within the T slots 16 and 16'. These T slides are each suitably secured to the base members 45 and 45' by welding, or as here indicated, by bolts 56 and 56'. It will be noted that to render these elements more secure and to facilitate alignment when replaced, plates 45 and 45' are preferably slotted as at 53 and 53' to receive the end of the tongue portion of each of the T slides 55 and 55'. As indicated in Figure 6, these T slides, as well as the T slots which accommodate them, are chamfered at their respective corners to further smooth sliding contact without binding.

It will be seen from the foregoing that by the construction thus far described, the reel 20 is mounted for rotation in suitable journal bearings 35 and 35' and that the latter, the pillow blocks, and the entire spool assembly is designed for reciprocating or shaker motion on the two sets of slides or trackways provided for this purpose. The T formations of members 55 and 55' permit reciprocal movement with complete freedom yet the T slides, by positive engagement with slide rails 12 and 12' prevent the assembly from becoming disengaged with the base member 11. Since tension upon the conveyor belt may reach the neighborhood of 10,000 lbs., this construction, or an equivalent thereof, may be essential to retain the assembly in the described trackways while subject to stresses of this magnitude.

Figures 9, 13:
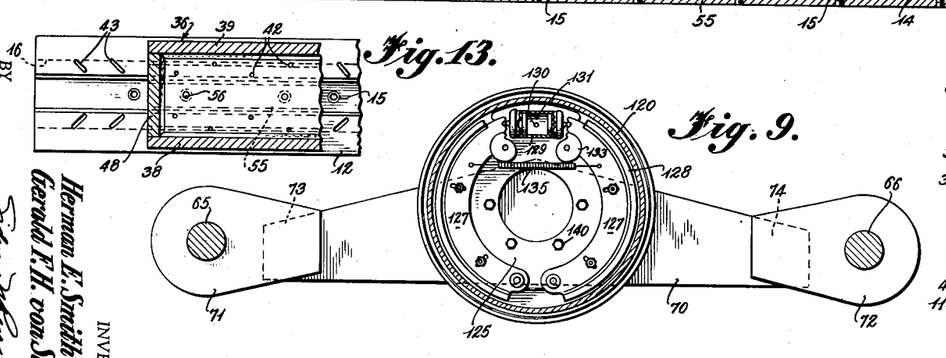
Figure 9 is a section view taken on the line 9—9 of Figure 6.
Figure 13 is a section taken on the line 13—13 of Figure 7.
Figure 14:
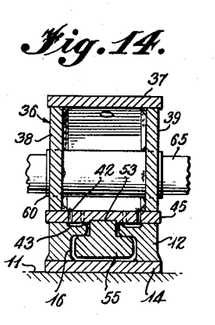
Figure 14 is a section taken on the line 14—14 of Figure 7.

Referring to Figures 13 and 14, it will be observed that each of the pillow blocks 36, 36' are hollow and of box-construction having side walls 38, 39 and top 37 as well as end plates 48 and 49. Each of the pillow blocks is thus suitable as an oil reservoir for lubrication of the slide mechanism. To this end, oil filter plugs 41 are provided and each base or slide plate apertured to permit oil to lubricate the contacting surfaces. In Figures 13 and 14, these apertures, designated 42, are located on each side of the centerline of base plates 45, 45', are staggered with respect to each other to assure complete spreading of the lubricant over as much surface as possible. Also, grooves 43 are provided on each side of the upper surface of each slide rail. Such grooves are angularly disposed, preferably at approximately 45°, to the longitudinal centerline of the said slide rails. The grooves serve the purpose of collecting lubricant discharged from apertures 42 as the pillow blocks pass over the slides. The area between the apertures thus pulls oil from the grooves, efficiently carrying it to the flat, or contacting, surfaces. Wick feeding of the oil may be approximated by passing doubled or quadrupled strands of yarn through the apertures 42. Such a lubrication system effectively lubricates the slides with little or no loss of oil due to excessive feed.

Figures 10, 11, 12:
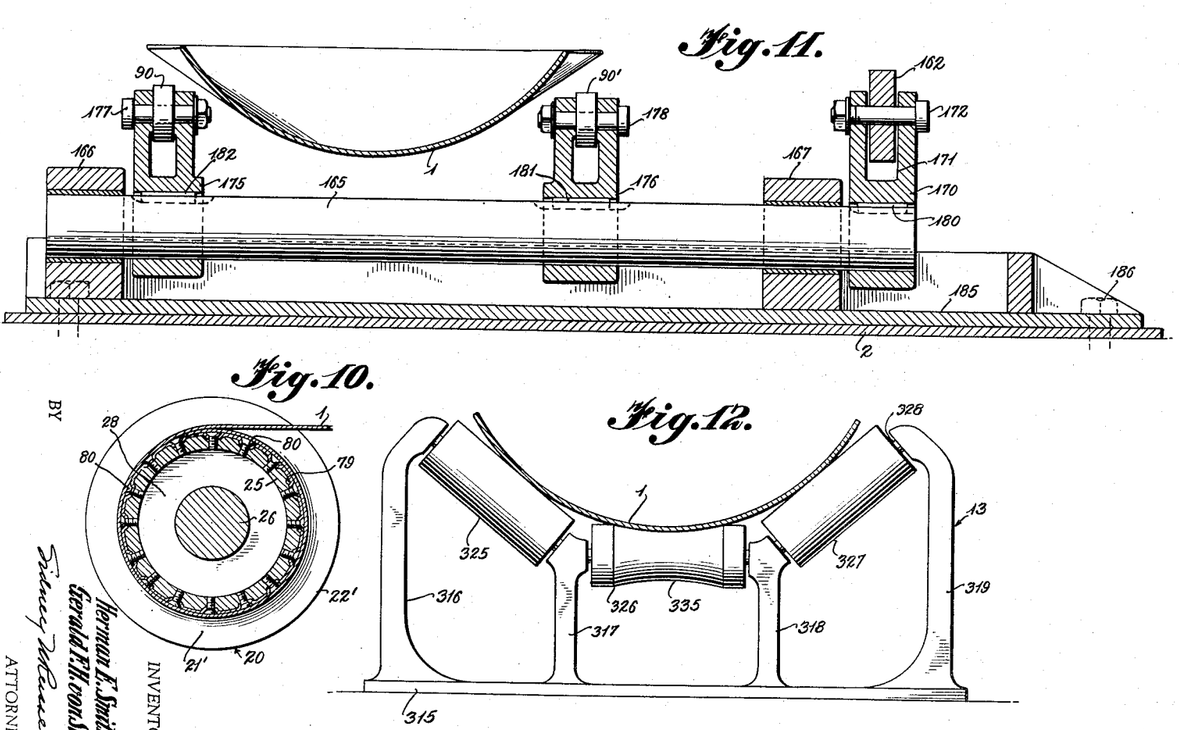
Figure 10 is a section view taken on the line 10—10 of Figure 6, showing the manner in which the conveyor belting is affixed to the spool.
Figure 11 is a section taken on the line 11—11 of Figure 2, showing the drive means for reciprocating the winding spool.
Figure 12 is a section taken on the line 12—12 of Figure 2 illustrating a form of belt supporting means.

It will be noted that in view of the relatively high degree of stress placed upon the conveyor belt 1, it must be affixed to the spool 20 in a most secure manner. This is accomplished by bolting at least one complete turn of the belting to drum 25 as shown in Figures 6 and 10, wherein such series of bolts are designated at 80. Preferably these bolts are flat-headed, and are sufficiently countersunk as at 79 that, when tightened, the metal on the first turn of the belt is drawn substantially into the countersink, thereby providing an uninterrupted curved surface to the remaining turns of the metallic strip conveyor belt. Strip metal of the order of .035" in thickness, if made of stainless steel, is of sufficient strength to normally satisfy the requirements of the conveyor element 1. Strip metal of this or equivalent characteristics is also sufficiently thin to be drawn into the countersink upon tightening of bolts 80 in the described manner, thus providing a connection which leaves a substantially smooth circumferential surface to the remaining layers of strip. The invention, as here shown and described, may accommodate various lengths of strip belting. From 300 to 500 feet of belting upon the reel will be sufficient for many purposes. Provision for greater lengths of conveyor belting may, of course, be made by increasing the height of the axis of the spool above the base member 11.

Each pillow block, 36 and 36', of the reciprocating assembly supporting the winding spool is rigidly secured to the other so as to assure firm support of the reel. This is accomplished by tranverse rods 65 and 66 which, as shown in Figure 8, are respectively positioned in any well known manner in collars 60 and 61 located in each pillow block. As a further means to assure rigidity of the carriage pillow blocks 36 and 36' which, as may be readily appreciated, are subject to considerable stress during reciprocation thereof, brace members 70 and 70' interconnect rods 65 and 66 at each extremity thereof. The interconnection is actually made through offset portions 71 and 71' upon one side of the spool assembly, as will be seen by reference to Figure 9 and by offset portions 72 and 72' mounted upon members 70 and 70' at the opposite side of the assembly. These offset portions, as here shown, may be welded as at 73 and 74 to the respective brace members 70 and 70'. As will be later described, such brace members 70 and 70' are further secured to the braking drum also mounted on the carriage.

Means are, of course, necessary to transfer reciprocatory motion from the shaker mechanism to the pillow blocks and winding spool 20, with supporting assembly. Transverse rod 66 supplies a means to this end. Referring to Figure 8, shaker rods 90 and 90', receiving motion from the power mechanism, are journaled to the transverse rod 66 by means of two coupling members 91 to which shaker rods 90 and 90' are affixed in a manner well known to those skilled in the art. It will be noted that the foregoing construction permits interconnection with the shaker mechanism from either side of pillow blocks 36 and 36'; viz, shaker rods 90 and 90' could be secured with equal effectiveness in the manner described to the opposite side of the spool assembly or to transverse rod 65.

It is further apparent that by providing brace members 70 and 70' as a means to interconnect transverse rod 66 to transverse rod 65, the reciprocatory motion is directly imparted to the latter. In consequence, the entire spool assembly may be considered positively driven for reciprocatory motion with equal force exerted upon both sides thereof.

*Belt extension and retraction mechanism*

As stated, the reciprocations imparted to the carriage and pillow blocks 36 and 36' are utilized to transfer that motion to a rotary motion of winding spool 20 by mechanism now to be described. Two winding wheels 95 and 95' are provided upon each side of pillow blocks 36 and 36' and adjacent the exterior sides of the latter. These wheels, having a central peripheral groove, are of the configuration of pulley wheels and, as indicated, may be fabricated of two separate plates welded together at points 92, 92', 93 and 93' in the manner indicated in this figure. A series of pins 97, all of identical construction, are provided in each of the grooves in each of these winding wheels 95 and 95'. Such pins may be mounted within the grooves in any well-known manner. As shown in this modification of our invention, each of these pins 97 is adapted to fit into transverse apertures provided in each winding wheel in a well understood manner. Eight of such pins 97 are provided in each of the winding wheels 95 and 95', herein shown, although that number may be varied within reasonable limits, dependent upon the amount of rotary motion desired for each stroke of the reciprocating mechanism.

Referring to Figure 6, each of the pins 97 is also provided with a bushing 98, preferably loosely mounted for rotation on said pins, and positioned within the groove of each winding wheel. To facilitate insertion and removal of both pins and bushings, each of the pins is grooved upon each end, as shown in this figure, so as to receive retaining rings 99. The latter may be snap rings of well-known type. With this type of securing structure, the pins and bushings may be easily inserted in position after assembly of the winding wheel and replaced as necessary due to breakage or wear.

These pins 97 are adapted to engage pawls 100 and 100', also mounted upon opposite sides of the winding spool assembly and adjacent each of the pillow blocks. The pawls are identical in construction and function and description thereof is limited to the pawl 100 shown in Figure 7. The pawls are mounted for pivotal movement upon a horizontal axis or pivot 101. The latter is, in turn, secured to a suitable mount 102 which is affixed in any desired manner to the base 11. The engaging end of the pawl terminates in a concave surface 105 which may be slightly greater than the circumferential curvature of each of pins 97. At the opposite end the pawl is provided with a foot pedal 106 which is weighted by a weight 108 to aid in maintaining the pawl in operative position or in the position shown in solid line in Figure 7. To maintain the pawl in an inoperative position, there is an aperture 110 in the foot pedal 106 designed to accommodate a transverse pin 111. The latter is mounted for transverse movement in an aperture in support 112. Support member 112 is adjustable vertically by reason of interconnection with a stud bolt 112', threaded at its opposite end to base 113, which in turn is affixed to base 11. It will be obvious that the pawl is maintained in its operative position merely by lifting the foot pedal and inserting pin 111 in the aperture 110 which is provided therefor. The engaging end of the pawl is also provided with an underplate 115, the purpose of which is to assure that the pawl will remain in engagement with each of pins 97 as they separately contact the pawl on stroke of the assembly from left to right (Figure 7).

Figure 7:
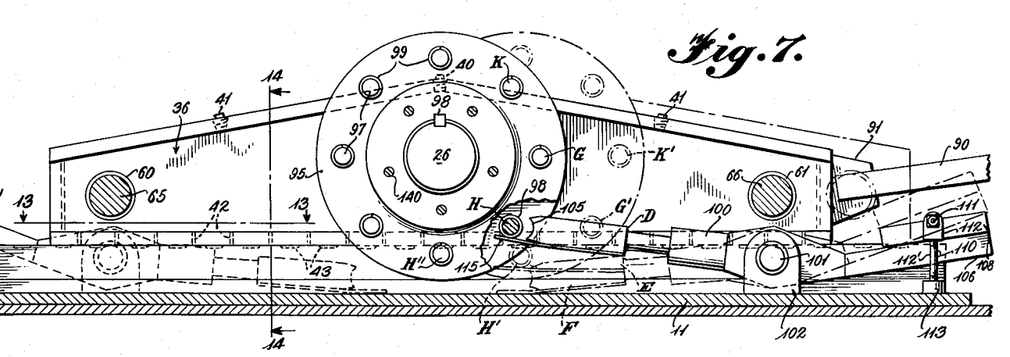
Figure 7 is a section view taken on the line 7—7 of Figure 6.

The pawl 100, shown in Figure 7, is illustrated in three different positions, D, E and F. In position D, shown in solid line, the pawl is in its operative position, the concave end surface 105 then being located at that level where it is in position to receive the pins 97 as they approach that end of the pawl during reciprocations of the spool assembly. In position E, one of the pins 97 is in contact with the surface 105 of the pawl at the completion of a stroke from left to right, and in position F, the pawl has been lowered to an inoperative position.

The manner of imparting rotary motion to the winding spool will now be described by reference to the positions of three of the pins 97 which are designated in Figure 7 as K, G and H. It will be noted that the total horizontal movement of the spool assembly during one stroke from left to right is represented by the center to center distance of pawl G to pawl K'. As the spool assembly traverses this distance from left to right, as seen in Figure 7, pin H catches on the end surface 105 of pawl 100 and is forced down to position H', causing the spool to rotate one-eighth of a turn. Pin G, by the same rotary motion, is moved to position G' and pin K is forced to position K'. The length of the shaker stroke is such that this movement of the pins represents rotation of the winding spool 45° in a clockwise direction, as viewed in Figure 7, or in a direction to unwind or extend the steel strip 1. It is apparent that on the reverse stroke of the spool assembly or from right to left, and again referring to Figure 7, pin H, which has been dropped to position H' by the aforesaid rotary motion, is now forced to position H'', permitting the pawl to swing upwardly by reason of the weight 108 on the pedal 106. The pawl thus again assumes an operative position to receive pin G which assumed the former position of pin H. On the next stroke of the assembly from left to right, the pawl engages pin H for another 45° rotary movement. Thus, the same cycle takes place with every complete reciprocation of the winding reel 20. With, for example, the shaker mechanism operating at 70 strokes per minute, and with a spool diameter of two feet, 16 feet per minute of strip steel conveyor, approximately, can be wound upon or unwound from the spool. The strip speed being a function of spool diameter, the speed will, of course, vary somewhat in accordance with the number of turns of strip on the spool at any given moment.

Rotation of the reel in an opposite direction is obtained simply by placing pawl 100 in an inoperative position through the use of pin 111 and adjusting pawl 100' to an operative position where it will then proceed to engage the pins mounted in the groove of winding wheel 95'. With engagement of pins 97 by pawl 100' in this same manner, the steel conveyor belt 1 is caused to be wound upon the spool because of the reverse rotation of the reel, the latter motion being imparted to it through intermittent action of the pawl and pin arrangement just described, but mounted upon the opposite side of the spool assembly.

Spool braking device

When the shaker conveyor mechanism comprising this invention is in operation, it is necessary that some means be utilized to restrain the winding spool from rotation in order that tension upon the strip is not lessened to any material degree. It is apparent that if the spool is permitted to unwind to any extent during operation, with a consequent slacking of tension upon the conveyor element 1, shaker motion cannot properly be imparted to that element.

To this end, a hydraulic or pneumatic braking device is affixed to the spool in such manner that any predetermined amount of braking force may be applied thereto. Referring to Figures 6, 7 and 9, it will be seen that brake drums 120 and 120' are secured by bolts 121 and 121' to the outer faces of each of the winding wheels 95 and 95'. The drums are secured to brake mounting plates 125 and 125' and the latter support mechanism for expansion and retraction of brake shoes 127, against the inner periphery of the drum. A hydraulic or pneumatic device 129 fitted with a pressure port 130 and an air vent 131 actuates the brake shoes in a manner well known in the art. In devices of this type, it is common to provide take-up cams 133 which are operatively connected to each of the brake shoes 127. A return spring 135 is provided for the return of these shoes to an inoperative position.

The foregoing briefly describes the type of brake device suitable for use with our invention; similar types of braking media may be employed so long as the braking force is adjustable and may be set at a predetermined amount sufficient to retain the winding spool in a stationary and non-rotating position during the shaker conveying operation, but insufficient to prevent effective pawl rotation of the spool during extension and retraction of the strip.

It will be observed that brace members 70 and 70' are both affixed at their respective center lines to the brake mounting plates 125 and 125' through the use of any common media such as a series of bolts 140 thus assuring further rigidity of pillow blocks 36, 36' and spool assembly.

It will be understood that the braking power is sufficiently applied to counteract any tendency of the winding spool to rotate, due to tension on the strip, during shaker movement of the conveyor belt 1. However, that braking force is not set sufficiently to retard rotation of the spool, during reeling or unreeling of the conveyor element 1, when either of cams 100 or 100' is placed in operative position. It will thus be evident that despite the set of the brake, these cams work against such braking power as is exerted thereby, causing rotation of the spool in the manner hereinbefore described. The amount of power which is exerted by each of the brakes can be readily determined by the operator and the braking force can be so estimated and set that the shaker conveyor operation and the unwinding operation of the spool do not interfere one with the other.

Shaker assembly

A conventional shaker drive mechanism is utilized to impart reciprocatory or shaker motion, and, by our novel arrangement of parts, rotary motion to the winding reel. Such drive mechanism is, of course, provided with the required electric motor 150 and suitable reduction gearing and linkages, here represented as located in housings 151 and 152, which are adapted to drive a crankshaft, not shown. The movement of the latter, through such gearing, is characterized by a slow forward and fast backward reciprocatory motion. The crankshaft is, in turn, connected to rocker shafts, also not shown, and the rocker shafts, in turn, operate two outside driving levers 155 and 156. The drive mechanism thus far described is conventional equipment and many types of the same, although primarily designed for the pan system, are adaptable as drive mechanisms for the instant invention.

In our apparatus, the two driving levers 155 and 156 are connected, as shown in Figure 2, to a fork 160. This fork is provided with any suitable arrangement of parts, such as would be known to those skilled in the art, to impart the shaker motion of the shaker drive to a shaker lever 162.

This reciprocatory movement of shaker lever 162 is imparted to the winding spool through an intermediate drive means more particularly illustrated in Figure 11, and which also may be conventional. By reference to this figure, it will be seen that a transverse shaft 165 is supported for rotary movement upon two bearings 166 and 167. Upon one side of the shaft 165 is secured a rocker arm 170 having at its upper end a slot 171 to receive the shaker lever 162. The latter is apertured to receive a pivot bolt 172 which maintains the shaker lever in operative position for oscillation of the transverse shaft 165. At the opposite end of the shaft 165, a similar rocker arm 175 is positioned in an analogous manner and intermediate the two arms 170 and 175 a further rocker arm 176 is also affixed to the shaft. Rocker arms 175 and 176 are similar in structure to arm 170, each being provided with pivot bolts 177 and 178 upon which are located for free pivotal movement two shaker rods 90 and 90' respectively. The rocker arms 170, 175 and 176 may be affixed to the transverse shaft 165 in any well known manner. As here shown, the arms are keyed by keys 180, 181 and 182 to shaft 165, thus securing the arms against turning on the said shaft. It will be understood that conventional means, well known to those skilled in the art, may be utilized to further secure such arms as well as prevent transverse movement of the shaft, such as by threading the shaft and providing suitable tapers, spacers and nuts thereon.

The manner in which shaker rods 90 and 90' are interconnected with the pillow blocks 36 and 36' has been discussed in the foregoing. By reference to Figure 7, shaker rod 90 is shown affixed to shaft 66 through the coupling 91. A similar method of connection is provided for shaker rod 90' but is not here shown.

The bearing mounts 166 and 167 are secured to a base plate 185 and the latter in turn is positioned through the use of bolts 186 or by some similar well known method to the base plate 2.

By the foregoing, it should be readily understood that the conventional shaker mechanism is, by the use of the arrangement of parts described, readily adaptable for use with our invention. This arrangement permits a reciprocatory motion of the type described to be transferred to the winding spool assembly and from thence to the metallic strip belt.

The tramming apparatus

Reference is now had to the tramming, or tension, portion of the mechanism previously generally referred to as C. As stated, the tramming means is mounted upon a portable carrier taking the form of a tractor having the usual type of link and lug treads. The treads are supplied with power through two electrical motors 200 and 201 through suitable gearing arrangement, not shown, which is conventional and forms no part of this invention. These motors drive the treads 205 and 206 in any suitable and known manner. Housings 210, 211 and 212, located upon the side of the tractor or trammer, are provided for various motor controls such as electrical contactors, resistors, etc., all of which is conventional equipment known to those skilled in the art. An operator control lever is shown at 213 for control of the motors either to move the trammer forwardly, reverse movement of the treads or, by actuation of the treads singly, to turn the tramming means to the right or left.

Because of the considerable tension upon the strip 1, it is preferable to provide the trammer with additional weights to aid in maintaining the balance thereof. These are shown at 215, 216 and 217 and may be lead plating or any similar and reasonably heavy material. The additional weight 217 upon one side of the trammer acts as a counterweight to counterbalance the weight of the control mechanism just referred to and positioned upon the opposite side.

Drive sprockets for the treads are journaled upon suitable bearing shafts 202 and 203, frame members 207 and 207a supporting the former, and frame members 208 and 208a, the latter.

The treads and frames 207a and 208 are separated by three transverse beams 220, 221 and 223 which, as will be seen, offer support for the saddle and the spring tension means. The transverse beams 221 and 223 supply support for two longitudinal main support rods 230 and 232, each of which is securely affixed by appropriate means, as by welding, to each of these transverse beams at the respective ends thereof. Mounted upon rods 230 and 232 for longitudinal slidable engagement therewith are two saddle bushings 231 and 233. These respond to tension upon the strip and to the thrust of the spring means by reciprocation upon the aforesaid main support rods. Each of the two saddle bushings intermediate their respective ends has a pair of lugs adapted to retain the saddle in place. Thus, saddle bushing 233 is provided with lugs 242 and 243 and saddle bushing 231 is provided with lugs 240 and 241. Each of the described lugs is apertured to receive a pivot pin which engages the saddle in a manner to be described.

Also longitudinally mounted between the two beams 221 and 223 is a series of spring rods, here four in number, 250, 251, 252 and 253. Each of the saddle bushings is provided with an end plate such as at 260 and 261 and each of these end plates is apertured on either side thereof to engage, in slidable contact, one of the tension spring rods. Thus, saddle bushing plate 260 receives spring rods 250 and 251; and saddle bushing plate 261 receives spring rods 252 and 253.

Figure 4:
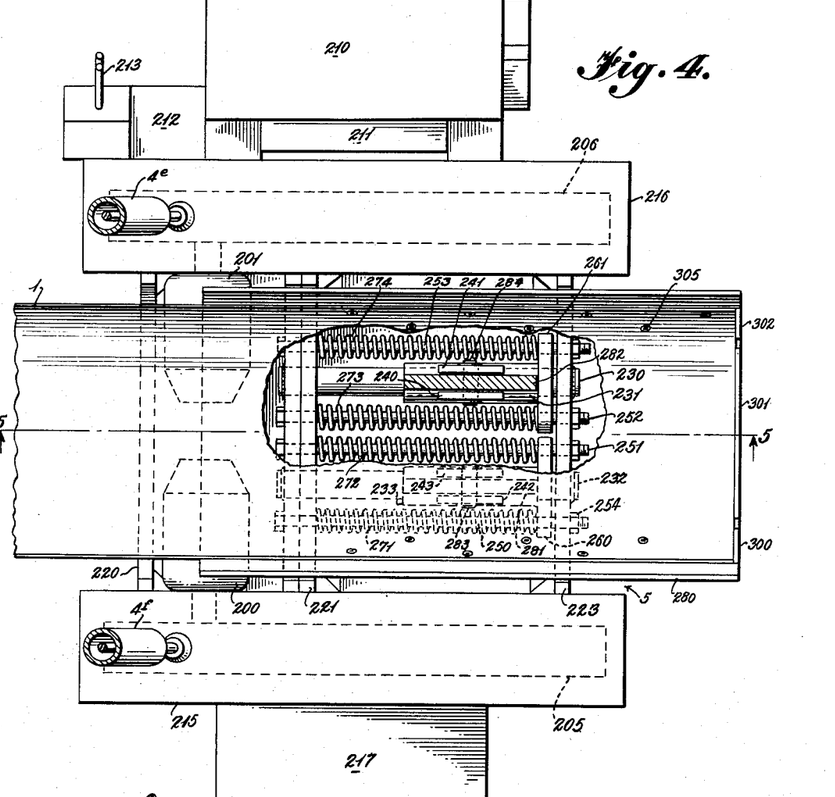
Figure 4 is a plan view, partly in section, of the tramming assembly shown in Figure 3.

Each of the spring rods is supplied with helical springs 271, 272, 273 and 274 and each of these springs, as shown in Figure 4, is positioned on the said spring rods, between transverse beam 221 and the saddle bushing plates 260 and 261. Thus not only do the saddle bushing plates keep the vertical lugs which are located thereon in vertical alignment, and consequently the saddle in proper alignment, but they also provide a surface against which thrust of the several springs is exerted. It will be seen that this thrust is exercised toward the forward end of the tramming means, or in a direction away from the winding spool assembly.

The saddle 280 is curved to assume a trough shape, and one which will approximate this natural shape of the metallic belting. Its underside is provided with a pair of downwardly extending lugs 281 and 282 which are apertured to receive pivot pins 283 and 284 which, as hereinbefore stated, are designed for insertion in the apertures of each of the described saddle bushing lugs. It will be observed that each of these saddle lugs 281, 282 has bottom edges angularly disposed with respect to the horizontal as indicated at 281a and 281b. By the foregoing construction, the saddle is pivoted upon a horizontal axis for vertical movement, but that movement is limited to a definite degree. For example, referring to Figure 5, the saddle could be pivoted in a clockwise direction to that point where the angular bottom edge 281a contacts the upper edge of saddle bushing 233, and when that occurs, no further movement in that direction is possible. The same is true of a pivotal movement of the saddle in an opposite, or counterclockwise, direction. Such pivoting of the saddle permits certain variations to take place from the horizontal between the reeling mechanism and the saddle without interference of the conveyor shaker motion.

Figure 5:
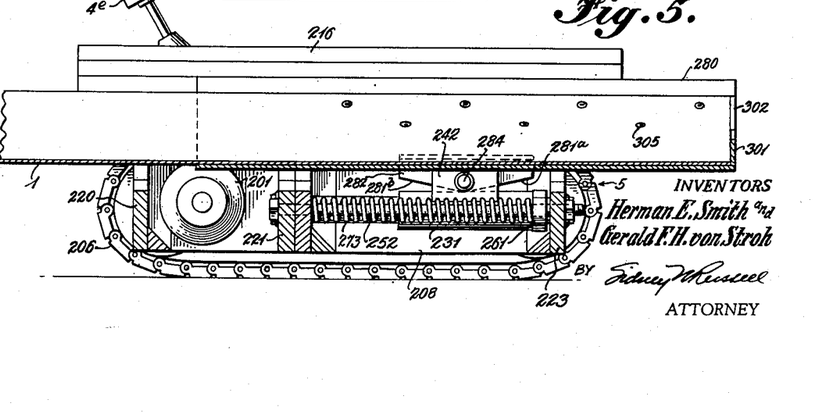
Figure 5 is a longitudinal sectional view taken on the line 5—5 of Figure 4.

The conveyor belt is mounted upon the saddle by the use of a plurality of flat headed screws 305. These are set in countersinks of relatively great depth in order that the belting may be drawn into the countersunk portion a substantial extent when screws 305 are tightened. The manner of so securing the belt is similar to that discussed with reference to the belt mounting of the winding wheel where similar countersunk screws 80 are employed. Preferably screws 305 are staggered with respect to each other, as indicated in Figures 4 and 5, so that any tension upon the belt is substantially evenly distributed over the saddle 280. On the forward portion of the saddle, trough supporting plates 300, 301 and 302 are provided to receive the usual type of rigid shaker trough such as hereinbefore described. In this manner the mechanism is made adaptable for interconnection to shaker conveyor systems of the pan or trough type.

As heretofore indicated, there is a series of roller supports 13 located intermediate the spool and tramming apparatus for support of the metallic or flexible belt during the conveying operation. These supports are shown in more detail in Figure 12 and comprise a series of upright members 316, 317, 318 and 319, all of which can be mounted upon a common base 315. These four upright members support between them in rotatable fashion three rollers 325, 326 and 327. Each of the rollers is, of course, provided with a journal 328 suitably mounted in the upright members so as to permit free rotation of the rollers upon frictional engagement with the shaker conveyor belt. The rollers are so positioned angularly with respect to each other that they are adapted to accommodate the surface contour or trough shape of the belt and may be further modified to approximate this shape. For example, roller 326 is shown as having a central concave portion 335 which central portion approximates that surface contour of the belt. Although not shown, side rollers 325 and 327 might be similarly designed. The entire roller support unit is portable in nature in the sense that it may be located at those positions intermediate the length of the belt that will provide adequate support therefor. They are also placed in substantial alignment with the center line of the belt between the winding reel and the tramming mechanism.

It will be understood that the flexible belt, if fabricated of metal such as stainless steel strip, may be formed with a permanent trough shaped set to it approximating the cross-sectional contour thereof indicated in Figure 12. However, this does not prevent the belt being wound flatly upon the spool, the inherent elasticity thereof, upon being reeled under tension, permitting it to be flatly coiled. As shown in Figures 8 and 12, the metallic strip gradually assumes its natural trough shape as it is unwound, the shape commencing to form a short distance from the spool.

*Operation*

From the foregoing description of this invention, the operation of this shaker conveyor mechanism should be readily apparent to those skilled in the art. The winding spool together with its related assembly is first placed, for example, in the room of a coal mine and aligned with the longitudinal axis thereof in the manner previously described. After location in the desired position, the winding reel and entire base 2 are assured against movement by adjustment of the jacks 4a, 4b, 4c and 4d against the roof 3 in the manner shown in Figures 1 and 2. The spool may have been previously wound with the desired footage of conveyor belting. Although not necessary, for convenience, one end thereof can be affixed, prior to interconnection with the tramming apparatus, to the saddle 280. It is obvious that the latter may be mounted upon the trammer after it has been maneuvered into proper position, by insertion of pivot pins 283 and 284 as shown in Figure 3.

The required amount of braking force is applied to the reel by the application of the braking mechanism 120. Such force should reasonably exceed the amount of tension expected to be placed upon the belt in order that during ordinary shaking operation, the winding wheel is not subject to appreciable slippage.

Depression of foot pedal 106 places pawl 100 in operative position. Subsequent actuation of the shaker drive causes the pawl to successively engage pins 97 and the spool thereby is intermittently but quickly rotated in a clockwise direction (referring to Figure 7) to unwind the spool. As hereinbefore indicated, such rotation is accomplished with sufficient force to overcome the braking power already applied to the spool.

During this operation of unwinding of the conveyor belting, the tramming mechanism C is gradually moved forwardly upon its treads at such speed that the belting is extended without curling or buckling but without substantial tension placed thereon. During the extension of the conveyor belt, if desired, belt supports 13 are placed at the desired intervals.

The tractor in its forward motion is kept in alignment by the operator by reference to the sighting optical device 10 previously described, located on base 2. After the belting has been extended to its desired position and elements A and C properly aligned, the shaker mechanism may be temporarily stopped and the foot pedal 106 moved to its inoperative position. However, alternatively, as will be appreciated, pawl 100 may merely be disengaged to permit shaker motion without further belt extension and without ceasing operation of the shaker mechanism. In any event, the tractor supporting the tramming mechanism is then moved slowly forward in such manner that the belt is extended under tension by reason of the thrust of springs 271, 272, 273 and 274, bearing against the saddle bushing plates 260 and 261.

Prior to placing the conveyor strip under such tension, hydraulic jacks 4e and 4f are positioned securely against the mine roof in the manner shown, thereby insuring against any backward movement of the trammer and its associated assembly which would result in a slacking off of the tension upon the belt. With actuation of the shaker mechanism and the consequent reciprocations of the winding reel, the entire length of belting is caused to move slowly forward, or in a direction toward the winding reel, and rapidly and with accelerated motion in the opposite direction, thereby inducing a motion which conveys material upon the metallic belt in a direction toward the reel.

Retraction of the belt is accomplished in exactly the same manner. Actuation of the oppositely mounted pawl 100' results in a counterrotation of the reel due to intermittent engagement of that pawl with pins 97'. During this retraction operation, the Caterpillar, after removal of jacks 4e and 4f, is slowly backed toward the winding reel mechanism. Any similar adjustment in length of the belt is, of course, accomplished in this same manner.

It will thus be seen that we have provided a unique and relatively simple method and apparatus for conveyance of materials upon a relatively flexible conveying element through the use of shaker motion. At the same time, the use of such a flexible element permits an extension and retraction thereof in a manner that is extreme in simplicity considering the relative complexities of the pan or trough systems of the prior art.

It is obvious that this invention may be varied in many ways and other expedients employed to accomplish the purposes thereof; however, it is to be understood that our invention is only limited by the scope of the appended claims.

What we claim is:

1. In a shaker conveyor system, a flexible element to convey materials by shaker motion, a winding spool for said element and a tension means, means to mount and extend said element under tension between said spool and the tension means, means to reciprocate said spool for conveying motion of said element, and means in association with said spool and responsive to said motion to impart rotary motion to said spool, whereby said spool may be rotated to wind or unwind said element.

2. In a shaker conveyor system, a flexible element to convey materials by shaker motion, a winding spool having a slidable support, means for mounting said element on said spool at one end thereof and a support at the opposite end thereof to place said element under tension, means to reciprocate said slidable support for shaker conveyor motion, and pawl means adapted to be placed in tangential engagement with said spool during actuation of said reciprocating means whereby said spool is rotated.

3. In a shaker conveyor system having a flexible strip for conveying materials by shaker motion, a winding spool for said strip mounted for rotation and reciprocation, a tension means, means to mount said strip between said spool and said tension means, means to reciprocate said spool for shaker conveyor motion, braking means for said spool to normally prevent rotation thereof during shaker motion thereof, and means responsive to said reciprocating means to rotate said spool against said braking means.

4. In a shaker conveyor, a flexible strip element for conveying materials, a winding spool for said strip element, a tension means, said strip element adapted to be mounted under tension between said spool and said tension means, said tension means including a movable support therefor, shaker means associated with said spool to impart shaker conveyor motion to said spool and said strip, means to extend and retract said strip comprising pawl means in association with said spool, said pawl means being actuated responsive to said shaker motion and adapted to impart rotary motion to said spool during actuation of said shaker means, said movable support being extensible and retractible to accommodate different lengths of strip between said spool and said tension means.

5. In a shaker conveyor system for a flexible conveyor belt, a winding spool mounted for rotation and upon which one end of said belt may be wound, a carriage assembly for said spool mounted upon a trackway for slidable engagement therewith, said trackway being transverse to the axis of rotation of said spool, a trammer provided with a tension mount for the opposite end of said belt whereby tension may be applied to said belt when extended, means for imparting reciprocatory conveying motion to said carriage whereby said carriage assembly reciprocates on said trackway and said motion is transmitted to the extended length of said belt.

6. In a shaker conveyor system for a flexible conveyor belt, a winding spool mounted for rotation and upon which one end of said belt may be wound, a carriage assembly for said spool mounted upon a trackway for slidable engagement therewith, said trackway being transverse to the axis of rotation of said spool, a trammer provided with a tension mount for the opposite end of said belt whereby tension may be applied to said belt when extended, means for imparting reciprocatory conveying motion to said carriage whereby said carriage assembly reciprocates on said trackway and said motion is transmitted to the extended length of said belt, and means for rotation of said spool comprising pawl means, a grooved winding wheel adjacent said spool and on each side thereof, pins in said grooves, each of said pins being adapted to engage the pawl means on each unidirectional stroke of said reciprocating means.

7. In a conveyor for materials provided with an extensible and retractible flexible conveyor belt, a winding spool for reception and winding of one end of said belt, a trammer for supporting the opposite end of said belt, means to impart shaker conveyor motion to said spool including a sliding assembly therefor, means to apply tension to the extended length of said belt, said tension means comprising longitudinal spring means on said trammer, means to rotate said spool to wind the conveyor element thereon and to unwind said element therefrom, said means including winding wheel means in operative association with said spool and provided with pins, and pawl means to engage said pins, brake means to normally prevent rotation of the spool during application of conveyor motion thereto, and means to engage said pins with said pawl means whereby shaker motion of said assembly rotates said spool against said brake means.

8. In a shaker conveyor of the character described, a flexible conveyor element having a permanent trough-shaped set thereto, one end of said element being mounted upon a rotatable spool upon which said element may be wound and unwound, the opposite end of said element being mounted upon a movable support, said support including means for exerting tension upon the length of said element, means to impart shaker conveyor motion to said element including a sliding carriage for said spool whereby said spool is reciprocated in a direction transverse to the axis thereof, brake means upon each side of said spool to normally restrain rotary motion thereof during reciprocations thereof, means to optionally extend said element from said spool, or wind said element thereon, said last named means including winding wheels in association with each side of said spool, circumferential pins in said wheels, pawls adjacent each of said wheels having positions for engagement and disengagement with said pins, said pawls in engaging position preventing lateral movement of said pins, whereby when shaker motion is imparted to said spool, engagement of one of said pawls with the pins of one of said wheels causes said motion to be converted to rotary motion of said spool.

9. In an apparatus of the character described, a flexible conveyor element, a rotatable winding spool on which said element may be wound and unwound, an oppositely mounted element receiving device, and means to impart shaker conveyor motion to said element comprising a carriage assembly to rotatably support said spool, said assembly resting upon slide means, trackways for sliding engagement with said slide means, a transverse shaker rod on said carriage, means to impart reciprocations to said carriage through said shaker rod, said trackways having T shaped slots therein, said slide means being provided with T shaped base members for engagement with said slots to maintain said carriage upon said trackways without substantial vertical movement, whereby shaker motion is imparted to said element throughout its length.

10. In an apparatus of the character described, a flexible conveyor element, a rotatable winding spool on which said element may be wound and unwound, an oppositely mounted element receiving device, and means to impart shaker conveyor motion to said element comprising a carriage assembly to rotatably support said spool, said assembly resting upon slide means, trackways for sliding engagement with said slide means, a transverse shaker rod on said carriage, means to impart reciprocations to said carriage through said shaker rod, said trackways having T shaped slots therein, said slide means being provided with T shaped base members for engagement with said slots to maintain said carriage upon said trackways without substantial vertical movement, brake means in association with said spool to normally prevent rotation thereof during actuation of said reciprocating means and means to rotate said spool against said brake means including winding wheel means in operative association with said spool and provided with peripheral pins, and pawl means to engage pins to prevent lateral movement thereof, whereby said spool is rotated upon unidirectional lateral movement thereof by engagement of the pawls with said pins.

11. In a shaker conveyor, a flexible conveyor strip to convey materials by reciprocatory motion, a winding spool upon which said strip may be wound or unwound, a trammer device provided with drive means, means for extending said strip between said spool and said trammer, means for imparting shaker conveyor motion to said spool and said strip, means responsive to said shaker conveyor motion for converting said motion to rotary motion to rotate said spool for the winding or unwinding of the said strip, means for maintaining said strip under tension, said means comprising a strip-receiving saddle on said trammer, a plurality of spring means on said trammer exerting thrust against said saddle away from said spool, said saddle being mounted for longitudinal movement on said trammer.

12. In a shaker conveyor, a flexible conveyor strip to convey materials by reciprocatory motion, a winding spool upon which said strip may be wound or unwound, a trammer device provided with drive means, means for extending said strip between said spool and said trammer, means for imparting shaker conveyor motion to said spool and said strip, means for converting said conveyor motion to rotary motion to rotate said spool for the winding or unwinding of the said strip, and means to maintain said strip under tension, said means comprising a strip-receiving saddle on said trammer, said saddle being slidably engaged with longitudinal tension rods on the trammer, said rods having spring means thereon exerting thrust in a direction away from said spool and against the saddle.

13. In a shaker conveyor, a flexible conveyor strip to convey materials by reciprocatory motion, a winding spool upon which said strip may be wound or unwound, a tramming device provided with drive means, means for maintaining said strip between said spool and said device, means for imparting shaker conveyor motion to said spool and said strip, means for converting reciprocatory motion to rotary motion to rotate said spool for the winding or unwinding of the said strip, said last-named means including winding wheel means in operative association with the spool and provided with peripheral pins, and pawl means adapted to engage said pins to prevent lateral movement thereof, whereby said spool is rotated upon unidirectional lateral movement thereof by engagement of said pawl with said pins, means for maintaining said strip under tension, said means comprising a strip-receiving saddle on said device, a plurality of spring means on said tramming device exerting thrust against said saddle away from said spool, said saddle being mounted for longitudinal movement on said tramming device.

14. In a shaker conveyor, a flexible conveyor strip of trough-shaped cross-section adapted to convey materials by reciprocatory shaker motion, a winding spool upon which said strip may be wound or unwound, a tramming device provided with drive means, means for attaching one end of said strip to said spool and the opposite end thereof to said device, sliding pillow blocks supporting said spool, means for imparting shaker conveyor motion to said blocks, means for converting reciprocatory motion to rotary motion to rotate said spool for the winding or unwinding of the said strip, said last named means including winding wheel means attached to the opposite sides of said spool and provided with peripheral pins, and pawl means adapted to engage said pins to prevent lateral movement thereof, whereby said spool is rotated upon unidirectional lateral movement thereof by engagement of said pawl with said pins, means for maintaining said strip under tension, said means comprising a strip-receiving saddle on said device, a plurality of spring means on said tramming device exerting thrust against said saddle away from said spool, said saddle being mounted for longitudinal movement on said tramming device.

15. In a shaker conveyor, a flexible conveyor strip of trough-shaped configuration in cross-section to convey materials by reciprocatory shaker motion, a winding spool upon which said strip may be wound or unwound, a tramming device provided with drive means, means for maintaining said strip longitudinally between said spool and the tramming device, a sliding assembly on which said spool is mounted, means for imparting shaker conveyor motion to said assembly and said strip, means for converting said motion to rotary motion of said spool to wind or unwind said strip, said last named means comprising winding wheel means attached to said spool on either side thereof, peripheral transverse pins in each of said wheels, pawl means on each side of said spool to engage said pins when said spool is driven by said shaker conveyor motion, said pawl means when engaged preventing lateral movement of said pins, whereby said spool is rotated upon each unidirectional lateral movement thereof, means for maintaining tension upon said strip including a strip receiving saddle of trough-shaped configuration on said tramming device, said saddle having longitudinal support rods for reciprocatory movement thereon, and a plurality of helical springs to exert thrust against said saddle.

16. In a shaker conveyor system, a flexible material conveying element, a carriage, a spool rotatably mounted on said carriage upon which said element may be wound or unwound, means to selectively reciprocate said carriage and said element for shaker conveyor motion of said element, and means responsive to said motion to selectively impart rotary motion to said spool whereby said conveying element may be wound upon or unwound from said spool.

17. In a shaker conveyor system, a flexible material conveying element, a slidable carriage, a spool rotatably mounted on said carriage upon which said element may be wound or unwound, means to impart to and fro shaker motion to said carriage, means to selectively impart said motion to said element, and means responsive to said motion of said carriage to selectively impart rotary motion to said spool.

18. In a shaker conveyor system, a carriage, means to move said carriage back and forth for shaker conveyor motion thereof, a spool rotatably mounted on said carriage, a flexible material conveying element adapted to be wound on said spool and unwound from said spool, and means actuated by said shaker conveyor motion for selectively rotating said spool, whereby shaker motion may be imparted to said element or said element may be wound upon or unwound from said spool.

19. In a shaker conveyor, a support, means to impart shaker motion to said support, a spool mounted for rotation on said support, a flexible element adapted to be wound on said spool, and selective means responsive to said motion to rotate said spool and impart shaker motion to said element, whereby said element may be wound upon and extended from said spool to a predetermined position or impelled by shaker motion.

20. In a shaker conveyor, a support, means to impart shaker motion to said support, a spool mounted for rotation on said support, a flexible element having one end thereof adapted to be wound upon and unwound from said spool, a tension means, the other end of said element being engaged with said tension means, and selective means responsive to said motion to selectively rotate said spool, whereby said element may be selectively extended and retracted with respect to said spool or reciprocated with shaker conveyor motion.

References Cited in the file of this patent

UNITED STATES PATENTS

| Number | Name | Date |
|---|---|---|
| 2,043,747 | Getty | June 9, 1936 |
| 2,318,712 | Pratt | May 11, 1943 |

FOREIGN PATENTS

| Number | Country | Date |
|---|---|---|
| 492,525 | Great Britain | Sept. 19, 1938 |
| 622,674 | Great Britain | May 5, 1949 |